United States Patent Office 3,403,627.
Patented Oct. 1, 1968

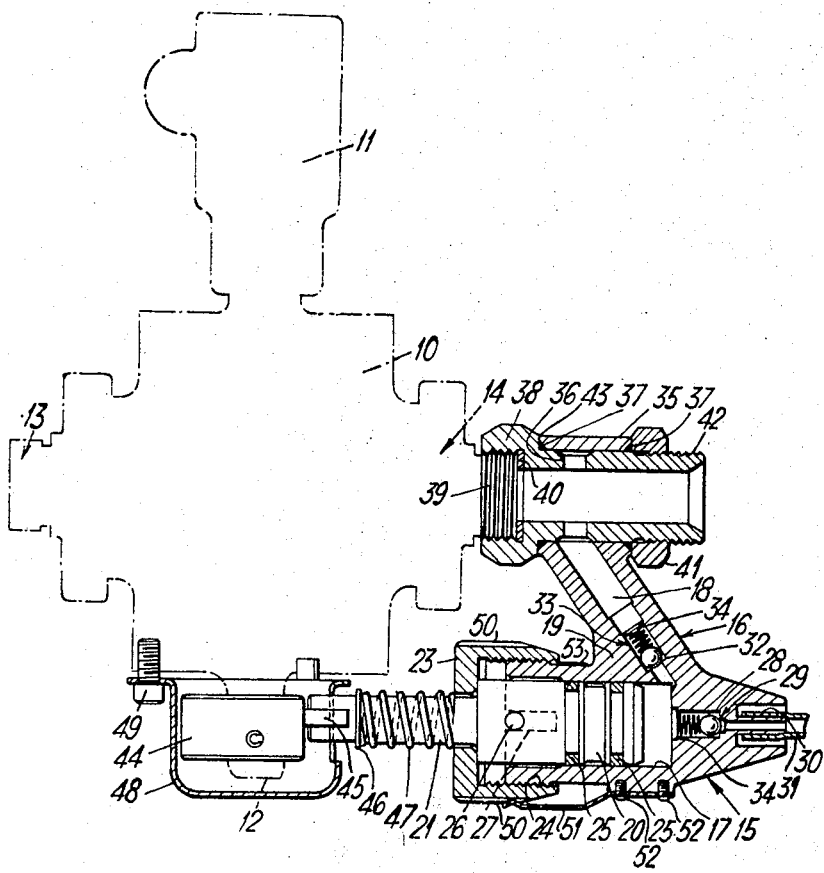

3,403,627
INJECTORS FOR FLUID PUMPS
Alan Grimshaw, Blackheath, near Birmingham, England, assignor to Lawrence Edwards & Co. (Engineers) Ltd., Kidderminster, England, a British company
Filed Dec. 29, 1966, Ser. No. 605,712
Claims priority, application Great Britain, Apr. 20, 1966, 17,198/66
7 Claims. (Cl. 103—6)

ABSTRACT OF THE DISCLOSURE

An injector for use in combination with a fluid pump having a rotary drive shaft provided with a cam and an outlet port disposed radially relative to the drive shaft. The injector is mounted on the pump body by means of an adaptor member engaged with the outlet port of the pump. The injector includes a piston reciprocable by means of the cam so as to inject fluid into the fluid leaving the outlet port of the fluid pump.

---

This invention relates to an injector operating in combination with a fluid pump to inject an additive into the primary fluid which is circulating through the pump.

The invention is specifically concerned with a fluid pump operated from the power take-off shaft of a tractor or like vehicle normally provided with an auxiliary shaft known as a power take-off shaft for driving auxiliary equipment from the normal power unit of the vehicle. In the case of a fluid pump driven from the power take-off of a tractor there are occasions when it is desired to inject an additive into the primary fluid which is being delivered by the pump. Generally, the primary fluid is water and the additive required may be a detergent for washing purposes or an insecticide or the like for crop spraying and similar purposes.

The type of pump provided for the power take-off of tractors and like vehicles is a simple centrifugal pump having a driving shaft extending axially of an outer casing and having the outlet or discharge from the pump arranged radially in respect of the drive shaft.

The object of the invention is to provide an injector in combination with such a pump driven from the power take-off of a tractor or like vehicle and such injector being of robust and simple construction which is easy to fit in association with the pump and which occupies the minimum of space.

One embodiment of the invention will be described hereinafter by way of example with reference to the accompanying drawing which is a cross-sectional view of the injector mechanism showing, diagrammatically, it in association with a pump connected to the power take-off drive of a tractor.

Referring to the figure, a centrifugal pump, shown in chain dotted outline at 10, is fitted to the power take-off drive of a conventional agricultural tractor, not shown. Such a power take-off drive comprises a driving shaft (not shown), which projects from the housing 11 of the power take-off drive and is connected to one end of the drive shaft of the pump, the other end of which pump drive shaft projects outwardly, as shown at 12, from the opposite end of the pump casing 10.

The inlet of the pump is shown at 13 and diametrically opposite thereto is provided the outlet 14 of the pump 10, which outlet 14 is thus radial in relation to the pump drive shaft 12.

The injector device comprises a body having two generally tubular limbs 15 and 16 which are mutually inclined at an angle of approximately 45°. The two limbs 15 and 16 have an internal axially extending passage 17 and 18 respectively. A web 19 is provided between the two limbs 15 and 16 to brace them. The axial passage 17 in the one limb 15 constitutes a cylinder in which there is reciprocably mounted a piston 20 having an axially extending piston rod 21. The one end of the cylinder is closed by a sleeve 23 which is threadably engaged with a screw thread 24 formed on the exterior of the limb 15. The piston 20 is provided with two sealing rings 25 to prevent leakage of liquid between the piston and the walls of the passage 17.

The piston 20 carries a radially projecting pin 26 which may be engaged within one of two diametrically opposite grooves 27 formed in the wall of the passage 17. This prevents axial rotation of the piston 20 and piston rod 21 assembly and this is a necessary requisite as will be apparent hereinafter.

At the other end of the passage 17 to the end from which the piston rod 21 projects there is provided, as an axial extension of the passage 17, a further passage 28 of reduced diameter which provides an inlet passage for fluid to the cylinder constituted by the passage 17. The inlet passage 28 is controlled by a non-return ball valve 29 which allows liquid to pass into the cylinder 17 to prevent liquid from leaving the cylinder 17. This passage 28 communicates with an adaptor 30 which is connected to a supply of additive by any convenient means, such as by means of a flexible tube or pipe 31 which is engaged with the adaptor 30.

The passage 18 in the other limb 16 of the adaptor is connected to the cylinder 17, adjacent the end thereof from which the further passage 28 extends, by a passage 32 of reduced diameter. This passage 32 from which cylinder 17 is controlled by a non-return ball valve 33.

Circlips 34 are provided in the passages 28 to 32 respectively to provide an abutment for the coil compression springs which act on the ball valves 29 and 33 respectively.

On its outer end the other limb 16 of the injector is formed with a circular eye 35 to provide a "banjo" type of coupling with a tubular adaptor 36. Two sealing rings 37 of any suitable material such as neoprene are provided between the eye 35 and the adaptor 36. The adaptor 36 is formed at one end with an internally threaded sleeve 38 which is threadably engaged with an externally threaded outlet provided on the pump 10, a fibre washer 10 being provided between the fitting 39 and the sleeve 38. A nut 41 which is threadably engaged with an externally threaded portion 42 of the adaptor 36 serves to hold the body of the injector in position by screwing up against the eye 35 and thus urging the shoulder 43 between the sleeve 38 and the remainder of the tubular adaptor 36 into engagement with the other side of the eye 35 thus locking the eye 35 to the adaptor 36 and hence the remainder of the injector is secured to the adaptor 36 which, as explained hereinbefore, is secured to the pump 10 and thus the injector itself is rigidly secured to the pump casing 10 through the screw connection between the sleeve 38 and the inlet fitting 39 on the pump casing 10.

A suitable form of cam 44 is fixed upon the pump drive shaft 12 and this cam 44 operates upon the free end of the piston rod 21 of the piston 20 through the wheel 45 which may be provided by the outer race of a ball or roller bearing mounted on the end of the piston rod 21. It is for this reason that the pin 26 engaging within the groove 27 is provided to prevent axial rotation of the piston and piston rod assembly so that the axis of rotation of the wheel always lies parallel to the axis of rotation of the cam. The piston rod 21 is formed with a groove (not shown) adjacent the end thereof which carries the wheel 45 and in the groove there is engaged a circlip 46 which provides an abutment against which one end of the coil compression spring 47 acts. The other end of the spring 47 abutting against a portion of the sleeve 22 so that the piston rod 21 is maintained in resilient engagement with the cam 44 by the spring 47. A guard 48 is provided in the cam 44 and the co-operating end of the piston rod 21 to prevent accidental touching thereof. The guard plate 48 being secured to a portion of the pump casing 10 of a screw 49.

The sleeve 23 is provided with four grooves 50 equally spaced apart around the periphery within which grooves a spring arm 51 may be engaged the arm 51 being made of spring steel and being secured to the limb 15 of the adaptor by hammer drive screws 52. Thus the sleeve 23 may be releasably held in any one of four angular portions and hence its axial position relative to the end of the sleeve 15 may be adjusted and hence the stroke of the piston 20 may also be adjusted and thus the volume of liquid pumped may also be adjusted. A graduated scale 53 is provided to enable the desired stroke to be set.

In use, when the pump 10 is operated through the pump take-off drive 11 of the tractor the rotation of the cam 44 carried on the pump drive shaft 12 causes reciprocation of the piston 20 and thus a pumping action to drive the additive liquid in through the inlet 30 via the non-return valve 29 when the piston 20 moves outwardly and thus, when the direction of movement of the piston 20 changes, to discharge the liquid through the outlet passage 32 into the passage 16 via the non-return valve 33 so that it enters the outlet adaptor 36. There is thus provided a very simple form of injector which can be readily and easily fit into position without involving any modification of the existing parts of the pump. In addition, the adaptor 36 at the end thereof distant from the sleeve 38 is provided with an external screw thread spigot portion having the same dimensions as the screw thread on the outlet port 39 of the pump so that the injector unit may be inserted between the outlet of the pump and an existing pipe line.

What I claim then is:

1. In combination with a fluid pump having a rotary drive shaft provided with a cam, and an outlet port disposed radially relative to said drive shaft, an injector, including a body having a first limb which extends radially to said drive shaft and a second limb inclined to said first limb, a cylinder formed in said first limb, a piston reciprocable within the said cylinder and reciprocable by said cam, inlet means for fluid in said cylinder at one side of said piston, non-return valve means preventing exit of fluid from said cylinder through said inlet means, an axial passage in said second limb, exit means from said cylinder on said one side of said piston communicating with said passage in said second limb, non-return valve means preventing entry of fluid into said cylinder through said exit means, means mounting said injector on said pump body comprising an adaptor member threadably engaged with the outlet port of said pump, said adaptor member having an axial passage for fluid from said pump outlet and said second limb of the injector being connected to said adaptor, and said adaptor member having a radial passage to provide means enabling fluid to pass from said axial passage in said second limb of the injector to said axial passage in said adaptor member.

2. The combination as claimed in claim 1 wherein said second limb is provided with a cylindrical portion at the end thereof distant from said first limb which cylindrical portion engages around said adaptor member.

3. The combination as claimed in claim 2, wherein the means engaged by said cam comprises a wheel rotatably mounted at the free end of a piston rod which extends axially from said piston.

4. The combination as claimed in claim 3 wherein said wheel on said piston rod is urged into engagement with the cam by means of a coil compression spring.

5. The combination as claimed in claim 2 wherein said adaptor member has a screw threaded socket at one end to provide said threaded engagement with the outlet part of a pump and a screw threaded spigot at said other end of the same dimensions as the screw thread on the outlet part of the pump.

6. The combination as claimed in claim 1 wherein means are provided for adjusting the extent of axial movement of said piston.

7. The combination as claimed in claim 6 wherein said means comprises a sleeve threadably engaged with said first limb and having a portion which engages with the piston and piston rod assembly to limit outward movement of said assembly, the axial position of said sleeve relative to the end of said first limb being adjustable by rotating the sleeve to cause axial movement of the sleeve relative to the limb.

References Cited

UNITED STATES PATENTS

| | | | |
|---|---|---|---|
| 1,571,845 | 2/1926 | Lefebvre | 103—38 |
| 2,566,702 | 9/1951 | Harrigan | 103—4 |

ROBERT M. WALKER, *Primary Examiner.*